United States Patent
Vergnes et al.

(10) Patent No.: US 7,423,928 B2
(45) Date of Patent: Sep. 9, 2008

(54) CLOCK CIRCUITRY FOR DDR-SDRAM MEMORY CONTROLLER

(75) Inventors: Alain Vergnes, Trets (FR); Eric Matulik, Meyreuil (FR); Frederic Schumacher, aix en Provence (FR)

(73) Assignee: Atmel Corporation, San Jose, CA (US)

( * ) Notice: Subject to any disclaimer, the term of this patent is extended or adjusted under 35 U.S.C. 154(b) by 31 days.

(21) Appl. No.: 11/668,844

(22) Filed: Jan. 30, 2007

(65) Prior Publication Data

US 2008/0181046 A1 Jul. 31, 2008

(51) Int. Cl.
*G11C 8/00* (2006.01)

(52) U.S. Cl. .............. 365/233.12; 365/194; 365/233.13

(58) Field of Classification Search ................... 365/233
See application file for complete search history.

(56) References Cited

U.S. PATENT DOCUMENTS

| | | | |
|---|---|---|---|
| 6,043,694 A | 3/2000 | Dortu | |
| 6,396,322 B1 | 5/2002 | Kim et al. | |
| 6,504,790 B1 * | 1/2003 | Wolford | 365/189.02 |
| 6,509,762 B1 | 1/2003 | Moss et al. | |
| 6,721,232 B2 | 4/2004 | Kashiwazaki | |
| 6,728,163 B2 | 4/2004 | Gomm et al. | |
| 6,788,614 B2 | 9/2004 | Sawhney | |
| 6,807,125 B2 * | 10/2004 | Coteus et al. | 365/233.1 |
| 6,867,626 B2 | 3/2005 | Idei | |
| 6,930,949 B2 | 8/2005 | Schaefer | |
| 6,940,768 B2 * | 9/2005 | Dahlberg et al. | 365/201 |
| 6,950,350 B1 * | 9/2005 | Kerl | 365/193 |
| 6,958,634 B2 | 10/2005 | Rashid | |
| 6,982,579 B2 | 1/2006 | Lee | |
| 7,065,666 B2 * | 6/2006 | Janzen | 713/400 |
| 7,173,469 B1 * | 2/2007 | Rezeanu | 327/291 |
| 2004/0155690 A1 | 8/2004 | Andrews et al. | |
| 2004/0174751 A1 * | 9/2004 | Edo | 365/193 |
| 2005/0001663 A1 | 1/2005 | Lee | |
| 2005/0242850 A1 | 11/2005 | Kawasaki | |
| 2006/0001462 A1 | 1/2006 | Kim et al. | |

* cited by examiner

*Primary Examiner*—Son L Mai
(74) *Attorney, Agent, or Firm*—Schwegman, Lundberg & Woessner, P.A.

(57) ABSTRACT

A circuit for providing a delayed clock signal to a synchronous memory controller controlling a synchronous memory device comprises logic delay circuitry for performing synchronous memory device read access, the logic delay circuitry generating delay interval information. A programmable delay line receives a clock signal and the delay interval information, the programmable delay line delaying the clock signal by the delay interval. A 2-input XOR gate receives both the clock signal and the output of the programmable delay line, an output of the XOR gate providing a delayed 2X clock signal.

22 Claims, 16 Drawing Sheets

CLOCK CIRCUITRY FOR DDR-SDRAM MEMORY CONTROLLER

BACKGROUND OF THE INVENTION

1. Field of the Invention

The present invention relates clock circuitry to create a double clock frequency signal and/or delayed clock signal for a DDR-SDRAM memory controller to perform alignment of write access data and other signals.

2. The Prior Art

Double Data Rate (DDR) SDRAM devices can transfer data twice as fast as regular single data rate (SDR) SDRAM devices. This is because DDR-SDRAM devices can send and receive signals twice per clock cycle. This feature increases the complexity of receiving and sending data to or from the DDR-SDRAM device since the valid data windows are narrower than they are in SDR-SDRAM devices. FIGS. 1A and 1B illustrates the valid data windows for SDR-SDRAM devices and DDR-SDRAM devices.

In a typical application system such as a microcontroller circuit connected to DDR devices on a printed circuit board, DQS is a bidirectional control signal transmitted by the DDR-SDRAM devices during read operations and by the memory controller during write operations. The memory controller may be part of a microcontroller integrated circuit. As shown in FIGS. 2 and 3, for DDR device circuitry optimization, the DQS signal is provided edge-aligned with data for read operations and must be center-aligned with data for write operations. As shown in FIG. 2, it is common to use the falling edge of clock at twice the frequency of the system clock that drives DDR-SDRAM devices in order to write data to DDR-SDRAM devices without increasing the complexity of DDR-SDRAM controller and to guaranty that signal is center-aligned with data. FIG. 3 shows the use of a delayed DQS signal for reading data from DDR-SDRAM devices.

It would be advantageous to provide a system in which the signal required to provide the data alignment when write accesses are performed (2x clock or 90 degrees delayed) is independent of the clock driving other peripherals even if they are of the same frequency.

BRIEF DESCRIPTION OF THE INVENTION

The invention mainly takes place in a DDR-SDRAM controller that interfaces to a DDR-SDRAM device. The DDR-SDRAM controller is a digital circuit that can be found in many standard microcontrollers. The present invention is used to create the signal provided to the DDR-SDRAM controller in order to generate the DDR data and data mask signals (byte select) for write access. If the DDR controller is clocked at 100 MHz, the DDR requires also an additional clock of 200 MHz or a 100 MHz clock delayed by ¼ of the 100 MHz clock period.

The DDR-SDRAM controller already includes information of ¼ clock period delay to make DQS delay possible for read accesses. This existing information is applied to an additional delay line that receives the 100 MHz clock as input and generates a delayed signal (¼ period of 100 MHz delay) that can be used as is by the DDR-SDRAM controller. An alternative exists: the 100 MHz delayed signal can be combined with the non-delayed signal through a XOR gate to create a 200 MHz clock signal that may be used for the same purpose in the DDR-SDRAM controller.

BRIEF DESCRIPTION OF THE DRAWING FIGURES

DETAILED DESCRIPTION OF THE INVENTION

Persons of ordinary skill in the art will realize that the following description of the present invention is illustrative only and not in any way limiting. Other embodiments of the invention will readily suggest themselves to such skilled persons.

The present invention employs circuitry that uses an existing signal within the basic DQS delay circuitry of the DDR-SDRAM memory controller. The detailed schematic of the basic DQS delay circuitry is shown in FIG. 4.

Figure 4:
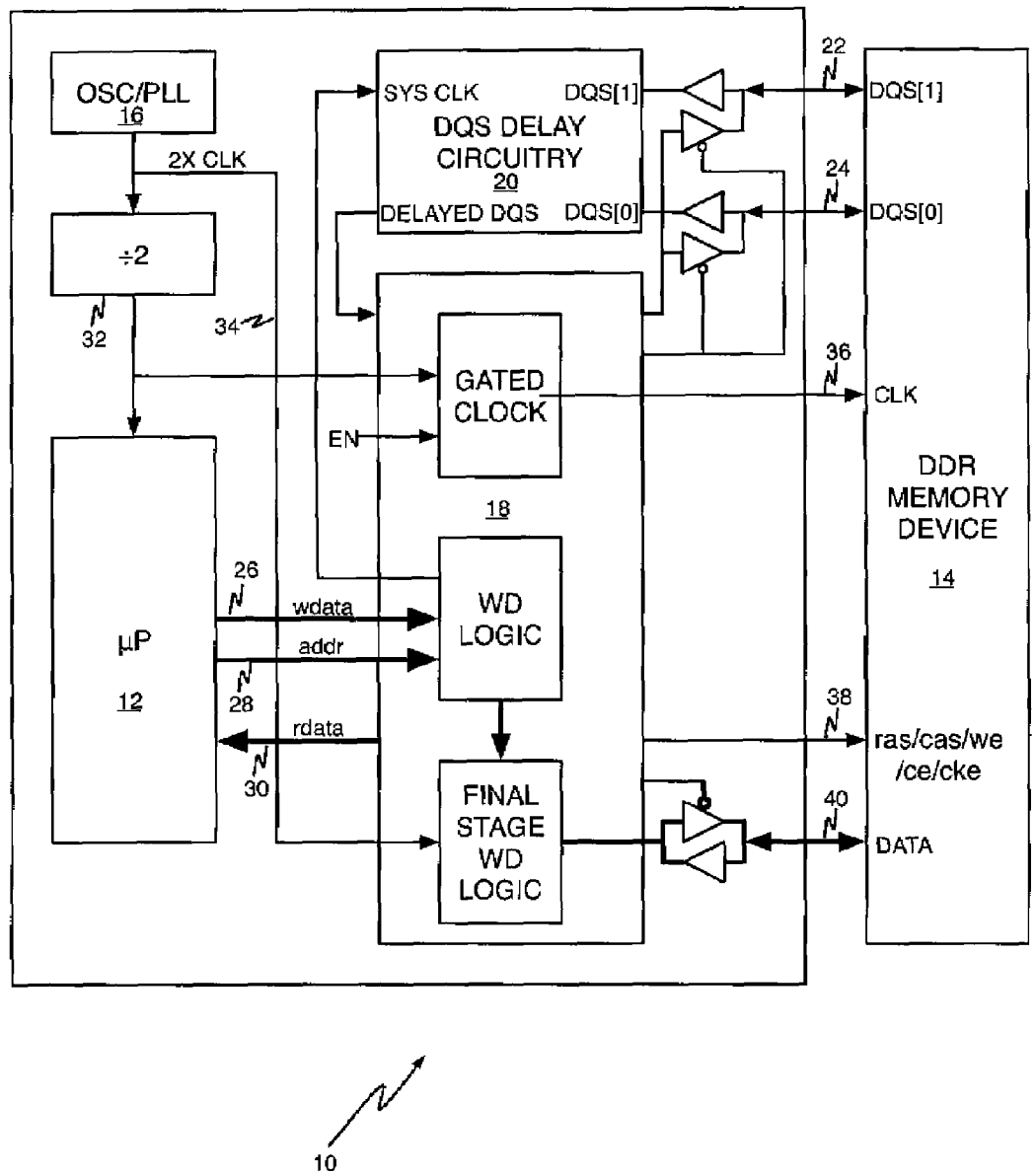
FIG. 4 is a block diagram of a typical microcontroller system in which the present invention may be advantageously employed.

FIG. 4 illustrates a typical system 10 using a microprocessor 12 connected to a DDR-SDRAM device 14. Conventional Crystal oscillators can generate frequencies up to 20 MHz. To get the clock frequencies for use by the microprocessor 12 and system bus (wdata 26, addr 28, rdata 30, and other control signals not shown) to 100 Mhz and higher, there is a need for PLL circuitry. The clock signal at twice the frequency of the system clock may be generated from the main phase-locked loop (PLL) 16 that can be found in a microprocessor circuit. The main PLL and oscillator circuitry is used to multiply the frequency produced by the crystal oscillator (external component, not shown). If the microprocessor circuit 12 drives a DDR memory device 16, a DDR-SDRAM memory controller 18 must be used and this module requires DQS-delay circuitry 20 to delay DQS signals 22 and 24 from DDR-SDRAM memory for read operations.

Figure 3:
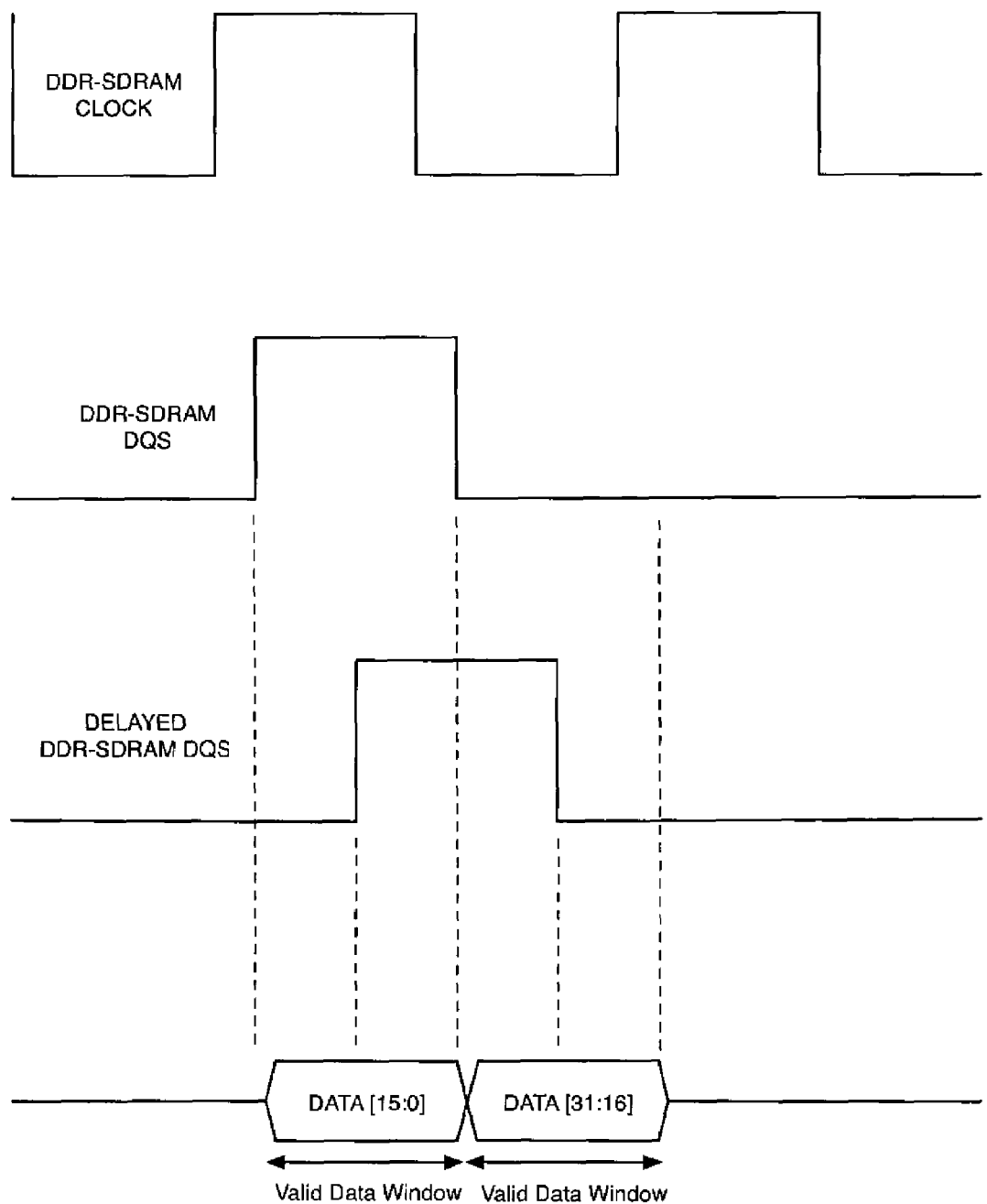
FIG. 3 is a set of waveforms illustrating the relationship between the DQS signal, a delayed DQS signal and the data for read operations in DDR-SDRAM devices.

If the system bus (26, 28, and 30) and microprocessor 12 (also known as CPU) are clocked at 100 MHz, then any read access to DDR memory controller 18 will require the PLL 16 to be configured at 200 MHz for the DDR-SDRAM controller 18 to align the data with the waveforms shown in FIG. 3. This is performed by logic within the DDR-SDRAM controller 18 that is clocked at 2× frequency of the main clock frequency of the DDR-SDRAM controller 18.

In order to drive the microprocessor 12 and system bus (26, 28, and 30) and main logic of the DDR-SDRAM controller module at 100 MHz, a divide-by-2 circuit 32 is used to derive the 100 MHz system clock 34 from the 200 MHz PLL output. Depending on the placement optimizations of the complete microcontroller logic, the PLL module 16 can be placed on the side of the die opposite to the location of the DDR controller module 18, therefore requiring the net carrying the 200 MHz to be routed over the layout. This requirement may lead to difficulties in accommodating the intrinsic propagation delay of the net with the timing requirement of the DDR memory and increases the probability of injecting noise onto this signal because it is routed through different areas of the layout.

If the microprocessor 12 does not need a system clock frequency higher than, for example, 100 MHz, the PLL 16 can be placed close to the DDR-SDRAM controller 18 and its associated PAD buffers bringing signals 22, 24, 36, 38, and 40 to I/O pins of the circuit therefore limiting the risk to conductor carrying the higher frequency (200 MHz). In such a case, only the 100 MHz signal will be routed through the layout of the circuit, but this is the case for any layout topologies because this signal feeds many modules in microcontrollers.

If the core of microprocessor 12 can be driven at a higher frequency than the system bus frequency (2× bus frequency, this is often the case) then 200 MHz clock net may be also routed to the microprocessor (plus the routing to the DDR controller) and there is a higher probability that a net will be routed over the complete layout of the circuit. This net will be difficult to optimize in terms of propagation delay and touchy for noise considerations. This issue may occur if there is a need to place the microprocessor on the opposite side of the layout to optimize the propagation delay with other peripherals like on-chip memories, DMA, etc., (not shown on FIG. 3).

Figure 5:
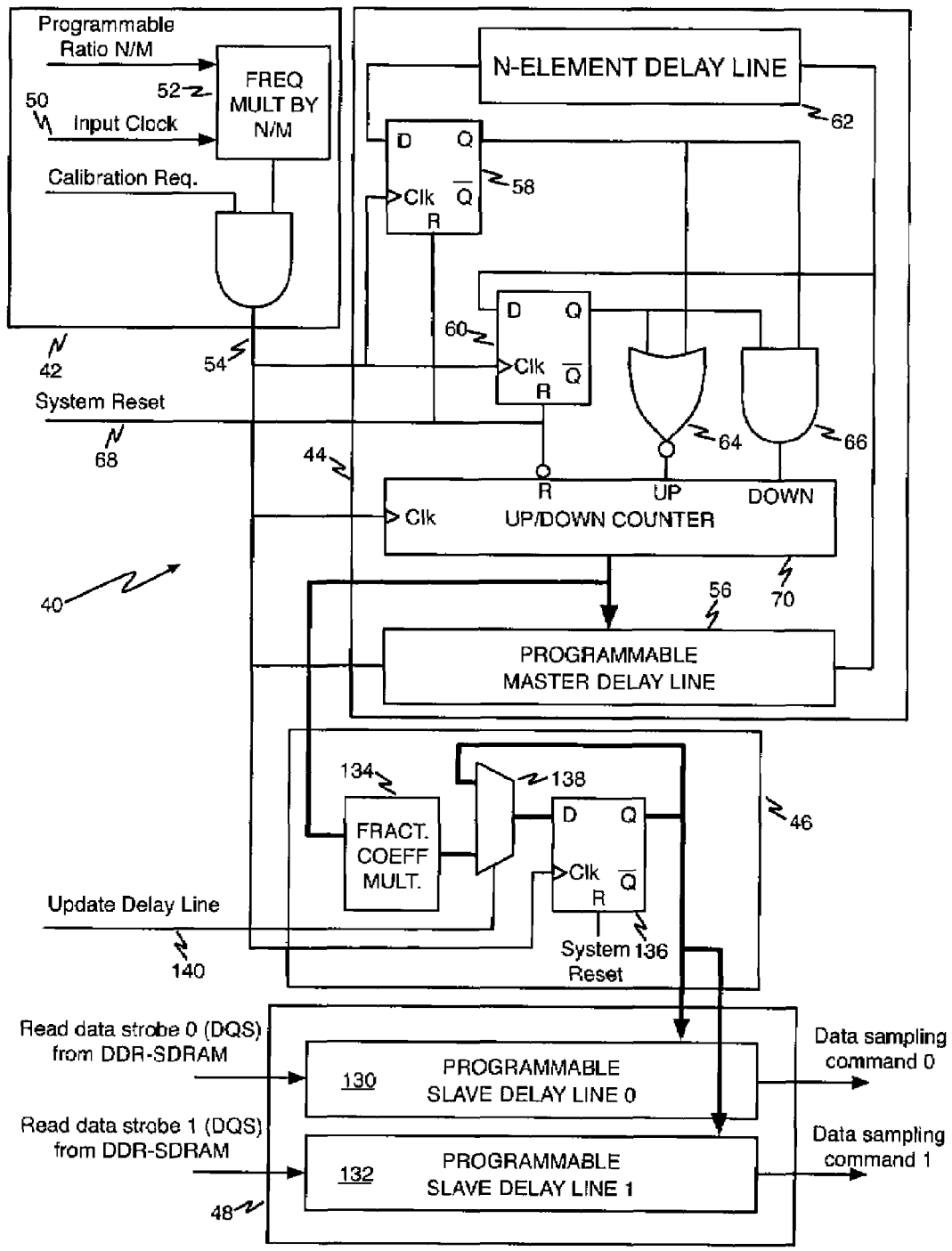
FIG. 5 is a block diagram of basic DQS delay circuitry for a DDR-SDRAM memory controller.

Referring now to FIG. 5, a block diagram shows basic DQS delay circuitry 40 for a DDR-SDRAM memory controller that may be used with the present invention. A simplified schematic diagram shows an illustrative example of DQS Delay circuitry 40. A simplified schematic includes blocks 42, 44, 46, and 48. The reference delay will be provided by block 42, then master locked loop circuitry 44 will determine the number of basic delay elements to cascade to obtain the reference delay. This number of delay elements will be converted in block 46 to get the final number of basic delay elements to delay the DQS signals by means of slave delay lines 48.

Block 42 allows obtaining a programmable reference delay by employing circuitry that multiplies the input frequency on line 50 by the programmable ratio N/M in multiplier 52, whose output has a frequency value equal to $[(N/M)*F_{input}]$, where $f_{input}$ is the input frequency on line 50. The output of block 42 is the system clock of the DQS delay circuitry 40 and will act as a reference signal delay.

This programmable value allows modification of the optimal data sampling point. The theoretical value of the optimal data sampling point is ¼ of the DDR-SDRAM clock period, but due to different printed circuit boards on which data and DQS signals are routed with different wire lengths and/or capacitances, plus differences in the internal circuits of the memory devices, the terminal points of these signals may be differently phased. Therefore, the optimal sampling point will be nominally about ¼ of the clock period but may end up to be a little bit more or less. As these conditions can vary from one printed circuit board to another, it is important to provide the capability to tune the sampling point through the user interface of the DDR-SDRAM controller.

Different methods exist to generate a programmable delay, and the module 40 of FIG. 5 is one example. The fractional coefficient multiplier can use a phase-locked loop (PLL) and two simple clock dividers to get a fractional divider.

For the descriptions of next modules, it is assumed that module 42 provides an output clock period on signal line 54 being twice the input clock period provided to the DDR-SDRAM device (i.e. if the DDR-SDRAM is clocked at 100 MHz, the frequency at signal line 54 is 50 MHz).

Block 44 contains the circuitry that locks on the reference delay provided by module 42. It allows determination of the number of basic delay elements of a delay line 56 to obtain a delay which is a fraction of the system clock period.

The number of delay elements determined by block 44 will be a known fraction of the number of elements required to delay the DQS signal from DDR-SDRAM devices. The delay line used in module 44 is designed with the same basic delay elements as the one that will be used in the slave delay line 48 to delay the DQS signal.

In the following example, the module 44 is designed in such a way that it locks on half of a system clock period. This leads to a simplified circuit architecture to reach the lock state from initial or reset state or from lock to lock state (due to a derating factor variation).

As in all locked systems, the architecture comprises a phase detector circuit to provide the information necessary to add or remove basic delay elements in the programmable delay line 56 to match the reference delay provided by stable clock signal 54.

In the example shown in FIG. 5, the phase detector circuit includes D-flip-flops 58 and 60, delay line elements 62 including a limited number of basic delay elements such as buffers or an even number of inverters, a NOR gate 64 and an AND gate 66. The circuit is driven by clock input 54, and uses the output of delay line 62 and the output of the programmable delay line 56 as a feedback clock.

When system reset is asserted on line 68, the D-flip-flops 58 and 60 are cleared, the programmable master delay line provides a feedback clock at the output of master programmable delay line 56 delayed by a single basic delay element because the up/down counter 70 is set accordingly from the outputs of NOR gate 64 and an AND gate 66.

Figure 8A:
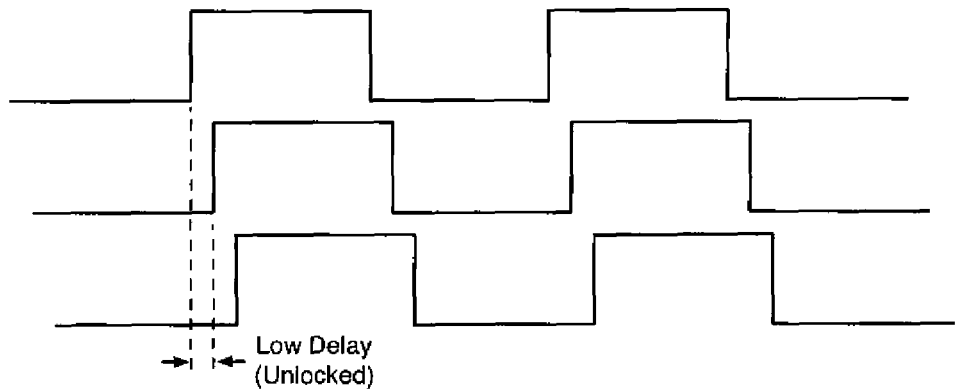
FIGS. 8A through 8C are timing diagrams showing the locked and two unlocked conditions for the circuit of FIG. 5.

After de-assertion of system reset on line 68, the D-flip-flops 58 and 60 start sampling logical "0" (the low portion of the waveform at the output of master programmable delay line 56). When the outputs of both D-flip-flops are cleared, the 2-input NOR gate 64 provides a logical 1 at the "UP" input of up/down counter 70 to indicate that the phase detector 44 is unlocked and requires more basic delay elements to be included in the master programmable delay line to reach the lock state. The 2-input AND gate 66 drives the "DOWN" input of the up/down counter 70 with a logical "0" to indicate that there is no need to remove delay elements in the programmable delay line 56. An example of this state is shown in FIG. 8A.

The up/down counter 70 modifies its output to instruct master programmable delay line 56 to add more delay. The programmable delay line increases its internal delay accordingly by selecting 1 more basic delay. The phase detector module 44 is still in its unlocked state.

Figure 8B:
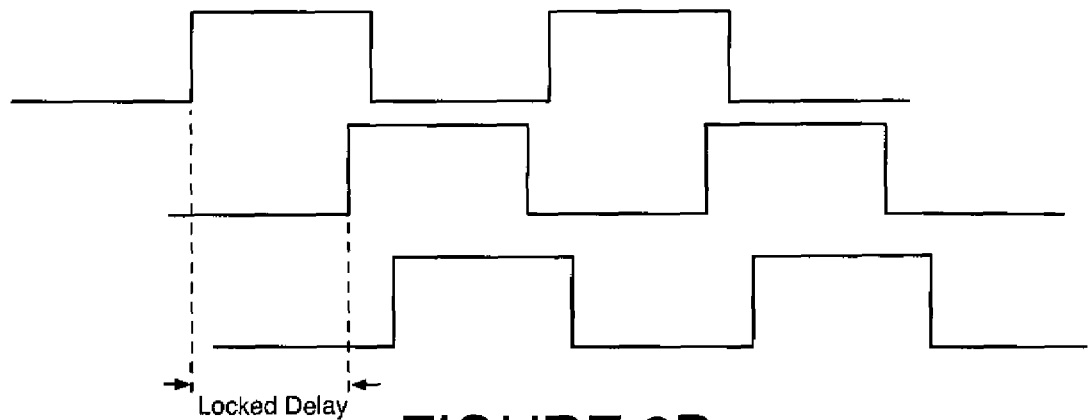
Figure 8C:
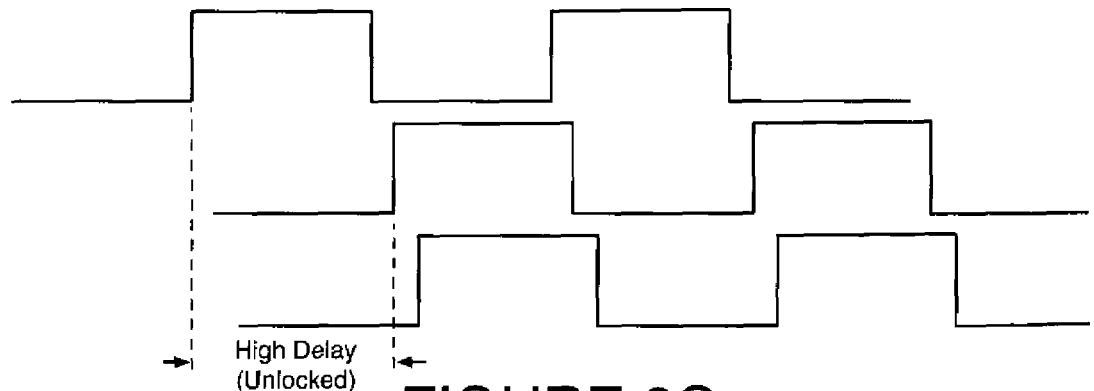

If the delay becomes greater than the reference delay provided by the clock period of system clock at its output 54, both D-flip-flops 58 and 60 sample a logical "1." The 2-inputs NOR gate 64 returns logical "0" to the "UP" input of up/down counter 70 and the 2-input AND gate 66 provides a logical "1" to the "DOWN" input of up/down counter 70. Under these conditions, up/down counter 70 modifies the value provided on its output to instruct the master programmable delay line 56 to remove one basic delay element. The master programmable delay line decreases its internal delay accordingly. The phase detector 44 is still in its unlocked phase. An example of this state is shown in FIG. 8C.

When the programmable delay line 56 delays the system clock on signal line 54 by half the system clock period (locked state), D-flip-flop 58 samples a logical "1" whereas D-flip-flop 60 samples a logical "0." This difference of sampled values is possible due to the presence of delay line 62 in the path of the data input of D-flip-flop 58.

Delay line 62 allows locating the falling edge of the delayed feedback clock at the output of delay line 62 to a time after the rising edge of system clock on line 54 and locating the falling edge of the feedback clock prior to the rising edge of the system clock on line 54. In this case both NOR gate 64 and AND gate 66 provide logical "0" to the "UP" and "DOWN" inputs of up/down counter 70. The output of up/down counter 70 does not change, indicating that the phase error provided by the phase detector is zero and the phase detector 44 is locked. An example of this state is shown in FIG. 8B.

The delay line 62 can be designed with basic delay elements such classical inverters or buffers. There is no need for more complex delay elements as will be disclosed with reference to the master programmable delay line 56.

The propagation delay between the input of delay line 62 and its output must be greater than a value defined as the sum of the setup and hold time of the D-flip-flops 58 and 60. This will limit the metastable behavior on both D-flip-flops for each sampling point. If one of the delayed signals to the data inputs of D-flip-flops 58 and 60 arrives in the metastable period of one D-flip-flop, then the other signal cannot be in the metastable period of the second one.

Persons of ordinary skill in the art will appreciate that there is still a probability of one of the D-flip-flops sampling data in a setup or hold period. There is no way to avoid this situation but an improvement exists in the definition of the intrinsic delay value (in delay line 62) of phase detector 44.

If the propagation delay of phase detector 44 is greater than the higher value of the metastable period among D-flip-flops 58 and 60 plus the minimum delay in the programmable delay line 62, the phase detector will stay in a locked state without metastable behavior of D-flip-flops 58 and 60. Metastable states will occur in transient phases.

In its locked state, the phase detector 44 defines a number of basic delay elements needed to delay the system clock by half the system clock period. A main objective of the present invention is to get ¼ of the DQS period or ¼ of the DDR-SDRAM device clock period. Therefore a conversion must be performed and applied to programmable delay line connected to DQS control input signals.

Figure 6:
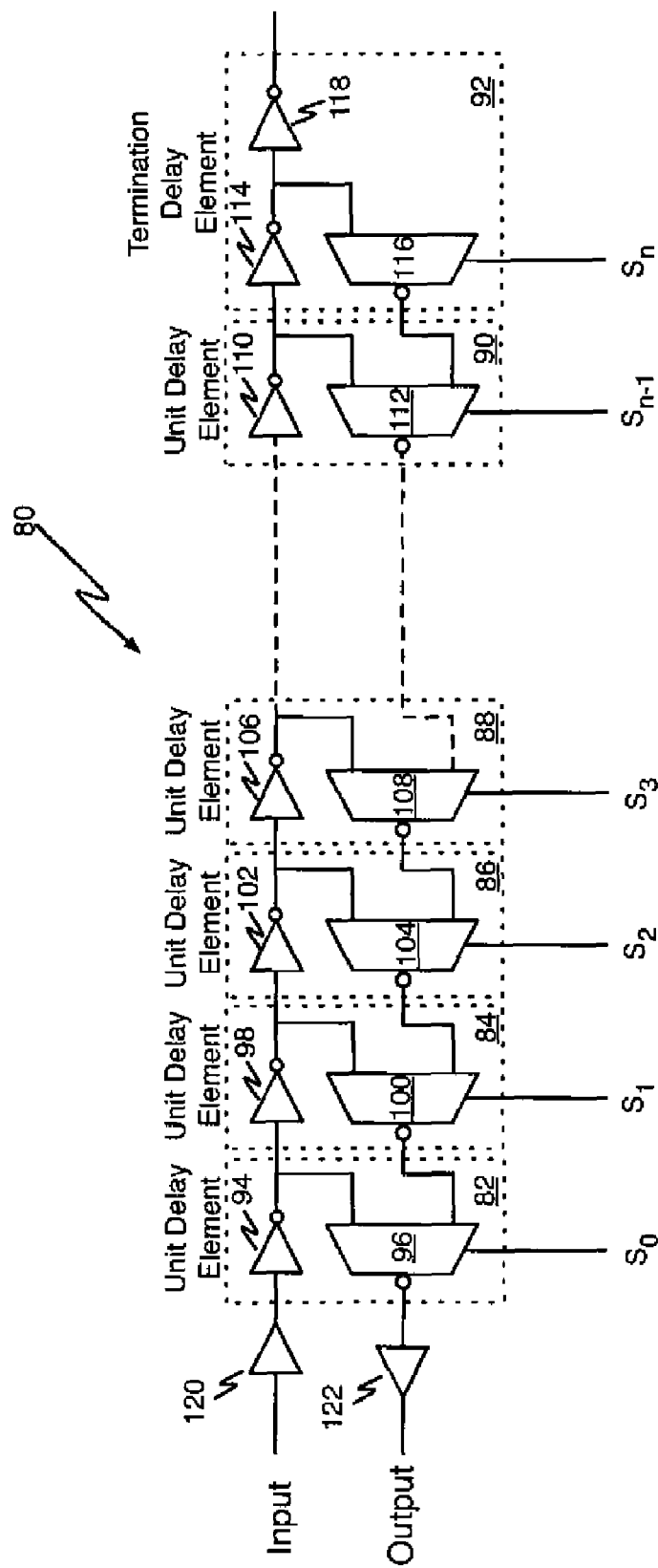
FIG. 6 is a schematic diagram of a programmable delay line that may be used in the DQS delay circuit of FIG. 5.

Referring now to FIG. 6, an illustrative programmable delay line circuit 80 to use as a programmable delay line such as master programmable delay line 56 in FIG. 5 is shown. The illustrative programmable delay line circuit 80 in FIG. 6 is shown having a plurality of cascaded unit delay elements 82, 84, 86, 88, 90, and 92. Each unit delay element includes an inverter and a multiplexer. The inverter of each unit delay element being cascaded with the inverter of the next unit delay element and the multiplexer of each unit delay element has one input cascaded with the inverter of the previous unit delay element. Thus unit delay element 82 includes inverter 94 and multiplexer 96; unit delay element 84 includes inverter 98 and multiplexer 100; unit delay element 86 includes inverter 102 and multiplexer 104; unit delay element 88 includes inverter 106 and multiplexer 108; unit delay element 90 includes inverter 110 and multiplexer 112; unit delay element 92 includes inverter 114 and multiplexer 116. The purpose of inverter 118 is to balance the capacitive load for each stage of the programmable delay line and therefore balance the propagation delay of each stage. An input buffer 120 and an output buffer 122 are provided to provide a correct input edge and provide a load-independent output.

Multiplexers 96, 100, 104, 108, 112, and 116 are controlled by select inputs $S_0, S_1, S_2, S_3, \ldots S_{(n-1)}$ and $S_{(n)}$, respectively. If the select input of a unit delay element is set to logic zero, its multiplexer selects the inverted output of the multiplexer in the next unit delay element. If the select input of a unit delay element is set to logic one, its multiplexer selects the output of its own inverter. Thus, only one select input in the programmable delay line circuit 80 need be set to logic one, in which unit delay element the signal is turned around and is directed back down through the chain of multiplexers and ultimately to the output buffer 122. Any select inputs further downstream in the chain that are set to logic one do not affect the operation of the programmable delay line circuit 80.

As an example, if the select input $S_0$ and $S_1$ are set to logic zero and the select input $S_2$ is set to logic one, the signal will pass through the input buffer 120, inverters 94, 98 and 102, multiplexers 104, 100 and 96, and through output buffer 122. The states of select inputs $S_3, \ldots S_{(n-1)}$ and $S_{(n)}$ will not affect the operation of the circuit.

Referring again to FIG. 5, block 46 functions to convert the data from the output of up/down counter 70 to a value that may be used by the slave programmable delay line circuits 130 and 132 in block 48 of the circuit of FIG. 5. Slave programmable delay line circuits 130 and 132 may also be configured as shown in FIG. 6. Module 46 in the circuit of FIG. 5 performs a converter function and allows to modification of the slave programmable delay lines 130 and 132 at appropriate locations during operation. The Delay Locked Loop comprising phase detector 44 is locked on half the clock period (i.e. the programmable delay line 56 delays the input clock signal on line 54 by half the clock period). Thus, using an identical slave programmable delay line to delay the DQS input control signal by ¼ of the clock period provided to the DDR-SDRAM device, the number of basic delay elements to select is ¼ of the value reported by up/down Counter 70 because the lock is performed on the half period of a clock which is divided by 2 versus the clock provided to the DDR-SDRAM memory.

Block 46 includes a fractional coefficient multiplier 134, whose input may be updated as necessary by the output of up/down counter 70. Its output is presented to D-flip-flop 136 via multiplexer 138. The data latched in D-flip-flop 136 is used to drive slave programmable delay lines 130 and 132 of block 48. The select input of multiplexer 138 is driven by the update delay line signal at line 140. As long as the update signal is not asserted, the output of D-flip-flop 136 is fed back to its data input through multiplexer 138. When the update signal 140 is asserted, the input of D-flip-flop 136 is driven by the output of up/down counter 70.

Due to the structure of the programmable delay line 56 as has been shown and described with reference to FIG. 6, the input value to supply to the switching inputs of the multiplexers in the delay line to select the delay amount is not a decimal coded value but rather a one-hot value. Therefore to divide the input value by 4, fractional coefficient multiplier 134 may be configured as a look-up table. The functionality of fractional coefficient multiplier 134 can be seen as a fractional coefficient multiplier on a non-decimal base. Table 1 shows an example of look-up table embedded in fractional coefficient multiplier 134.

Figure 7:
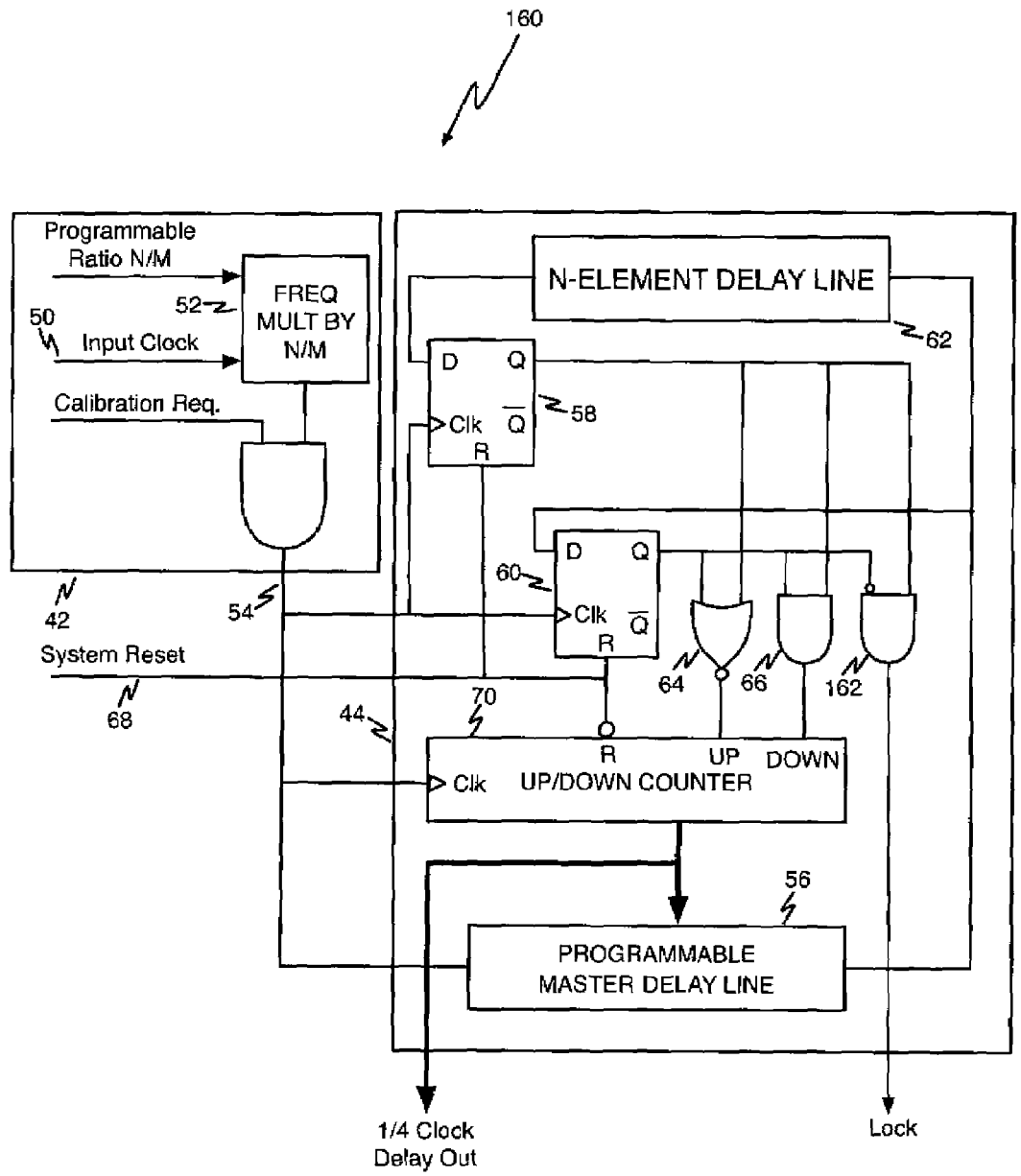
FIG. 7 is a diagram showing another phase detector circuit like that shown in FIG. 5 but further including an output signal indicating a locked condition of the detector.

Referring now to FIG. 7, a diagram shows another phase detector circuit 160 like that of FIG. 5 but further including an output signal indicating a locked condition of the detector. The elements of the phase detector circuit 160 of FIG. 9 that correspond to elements of FIG. 5 are identified by the same reference numerals that are used in the circuit of FIG. 5.

As in the example shown in FIG. 5, the phase detector circuit 44 includes D-flip-flops 58 and 60, delay line elements 58 including a limited number of basic delay elements, a NOR gate 64 and an AND gate 66. The circuit is driven by clock input 54, and uses the output of delay line 62 and the output of the programmable delay line 56 as a feedback clock. In addition to these elements that are shown also in FIG. 5, the phase detector circuit of FIG. 9 includes AND gate 162 having the one of its inputs that is driven from the output of D-flip-flop 58 inverted. The other input driven from the output of D-flip-flop 60 is not inverted. The output of 162 will be used to instruct the fine delay tuning that the master circuitry is locked.

When system reset is asserted on line 68, the D-flip-flops 58 and 60 are cleared, the programmable master delay line provides a feedback clock at the output of master programmable delay line 56 delayed by a single basic delay element because the up/down counter 70 is set accordingly from the outputs of NOR gate 64 and an AND gate 66.

After de-assertion of system reset on line 68, the D-flip-flops 58 and 60 start sampling logical "0" (the low portion of the waveform at the output of master programmable delay line 56). When the outputs of both D-flip-flops are cleared, the 2-input NOR gate 64 provides a logical 1 at the "UP" input of up/down counter 70 to indicate that the phase detector 160 is unlocked and requires more basic delay elements to be included in the master programmable delay line to reach the lock state. The 2-input AND gate 66 drives the "DOWN" input of the up/down counter 70 with a logical "0" to indicate that there is no need to remove delay elements in the programmable delay line 56. The output of AND gate 162 provides a logical "0" to indicate that the phase detector 160 is unlocked.

If the delay becomes greater than the reference delay provided by the clock period of the system clock, both D-flip-flops 58 and 60 sample a logical "1." The 2-inputs NOR gate 64 returns logical "0" to the "UP" input of up/down counter 70 and the 2-input AND gate 66 provides a logical "1" to the "DOWN" input of up/down counter 70. Under these conditions, up/down counter 70 modifies the value provided on its output to instruct the master programmable delay line 56 to remove one basic delay element. The master programmable delay line decreases its internal delay accordingly. The phase detector 160 is still in its unlocked phase.

When the programmable delay line 56 delays the system clock on signal line 54 by half the system clock period (locked state), D-flip-flop 58 samples a logical "1" whereas D-flip-flop 60 samples a logical "0" because of the presence of delay line 62 in the path of the data input of D-flip-flop 58.

Delay line 62 allows locating the falling edge of the delayed feedback clock at the output of delay line 62 to a time after the rising edge of system clock on line 54 and locating the falling edge of the feedback clock prior to the rising edge of the system clock on line 54. In this case both NOR gate 64 and AND gate 66 provide logical "0" to the "UP" and "DOWN" inputs of up/down counter 70. The output of up/down counter 70 does not change, and the output of AND gate 162 presents a logical "1" to indicate that the phase error provided by the phase detector 160 is zero and the phase detector 160 is thus locked.

TABLE 1

Example of look-up table embedded in module 431

| Input Value | Number of selected basic elements in Master |
|---|---|
| 1000000000000000 | 1 |
| 0100000000000000 | 2 |
| 0010000000000000 | 3 |
| 0001000000000000 | 4 |
| 0000100000000000 | 5 |
| 0000010000000000 | 6 |
| 0000001000000000 | 7 |
| 0000000100000000 | 8 |
| 0000000000000001 | 16 |

| Output Value | Number of selected basic elements in Slave Delay Line |
|---|---|
| 100000000000000 | 1 |
| 100000000000000 | 1 |
| 100000000000000 | 1 |
| 010000000000000 | 2 |
| 010000000000000 | 2 |
| 001000000000000 | 3 |
| 001000000000000 | 3 |
| 000100000000000 | 4 |
| 000000010000000 | 8 |

Care must be taken when changing the delay value. The value returned by fractional coefficient multiplier 134 cannot be applied to the slave programmable delay line at any time. It is preferable to apply a new value when there is no access being made to data from the DDR-SDRAM device. If this value is altered when the memory device is being accessed, the value must be held to avoid modifying the DQS delay when the DQS signal is in use to avoid the risk of a parasitic pulse when switching from one delay to another one in the programmable delay line. At any rate, if accesses are performed without interruption, there is a need to update the delay to take into account the possible derating factor variations. The DDR-SDRAM devices need to periodically interrupt the accesses to be able to refresh their contents. The times of these refresh cycles are known by the memory controller. This information can be used to safely enable the update of the slave delay line during refresh operations when the DQS signals are not used by the DDR-SDRAM memory controller and glitches on that line will not matter.

If such a scheme is used, when the memory controller (not shown) instructs the DDR-SDRAM device to perform refresh, it asserts a signal on line 140, thereby refreshing the contents of D-flip-flop 136. As soon as refresh period is finished, the line 140 is de-asserted and the multiplexer 138 re-circulates data to D-flip-flop 136.

Figure 9:
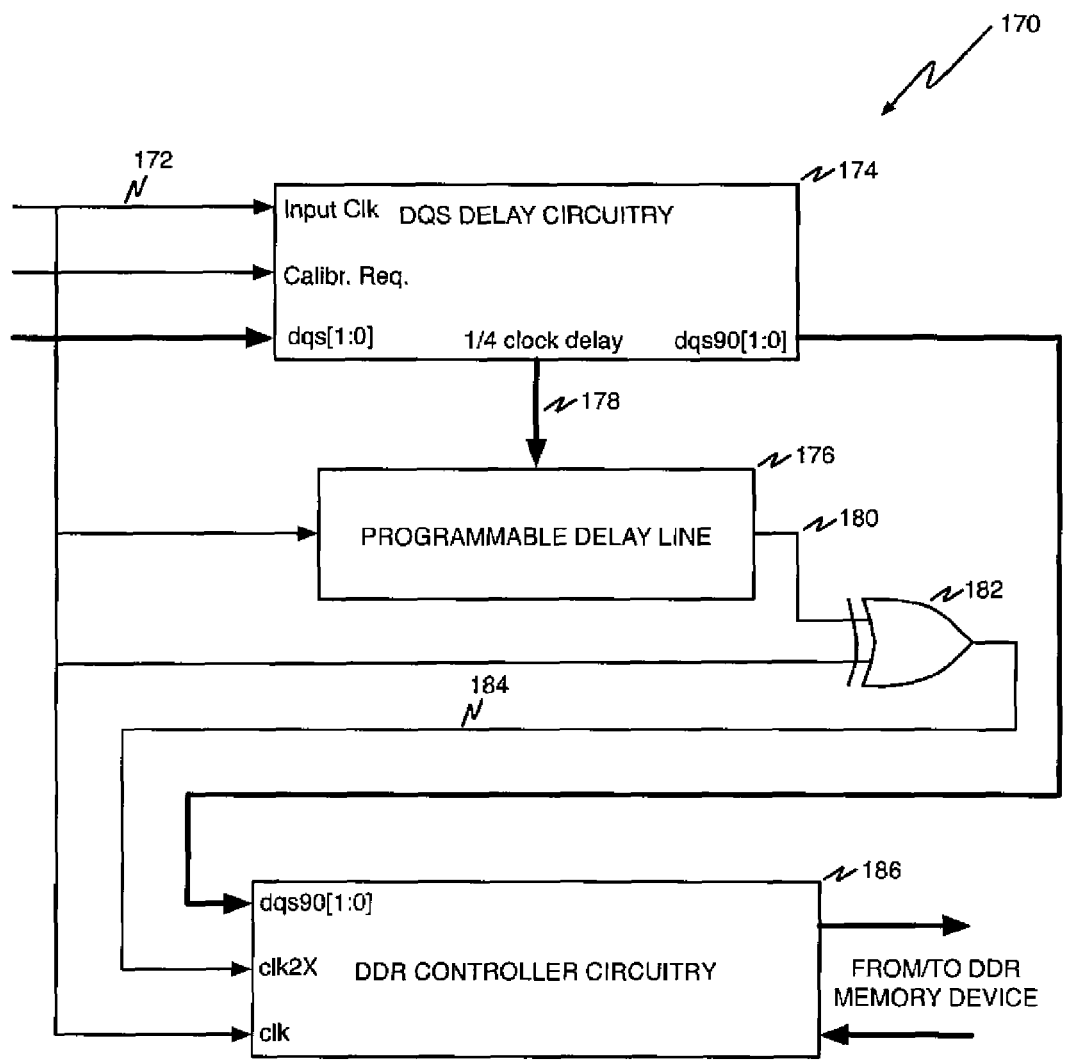
FIG. 9 is a block diagram showing connections between the invention and existing logic.

Referring now to FIG. 9, a block diagram illustrates the manner in which the present invention connects to existing DDR controller logic. DQS delay circuitry 170 contains modules 42, 44, 46, and 48 of the basic delay circuitry, which is described with reference to FIG. 5. The system bus clock signal 172 (the clock signal driving the main circuitry of the DDR controller and the clock passed to the DDR memory device) is input into DQS delay circuitry 174 and to a programmable delay line 176 of the same type that is embedded in DQS delay circuitry shown in FIG. 6. The programmable delay line 176 receives on line 178 the ¼ clock delay value already computed by DQS delay circuitry 174 for the DQS delay (the signal provided from DFF 136 to delay lines 130 and 132 in FIG. 5). This amount of delay represents ¼ of the period of the system clock on line 172.

The output of the programmable delay line on line 180 drives one input of a 2-input XOR gate 182. The other input of the XOR gate 182 is the system clock signal on line 172. The result is a 2× clock frequency on the output of XOR gate 182 on line 184.

This signal can be stopped when not used and is ready as soon as re-enabled whereas a PLL would need some time (transient time) to establish the required frequency. This enable can be performed by the existing logic DQS delay circuitry within DQS delay circuitry 170. Providing such an enable function is well known in the art.

Figure 1A:
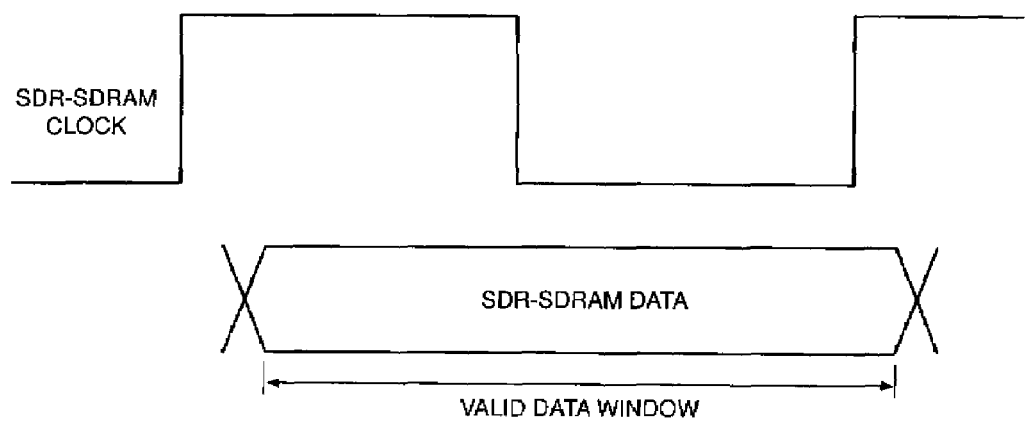
FIGS. 1A and 1B are waveforms illustrating the valid data windows for operation of SDR-SDRAM devices and DDR-SDRAM devices.
Figure 1B:
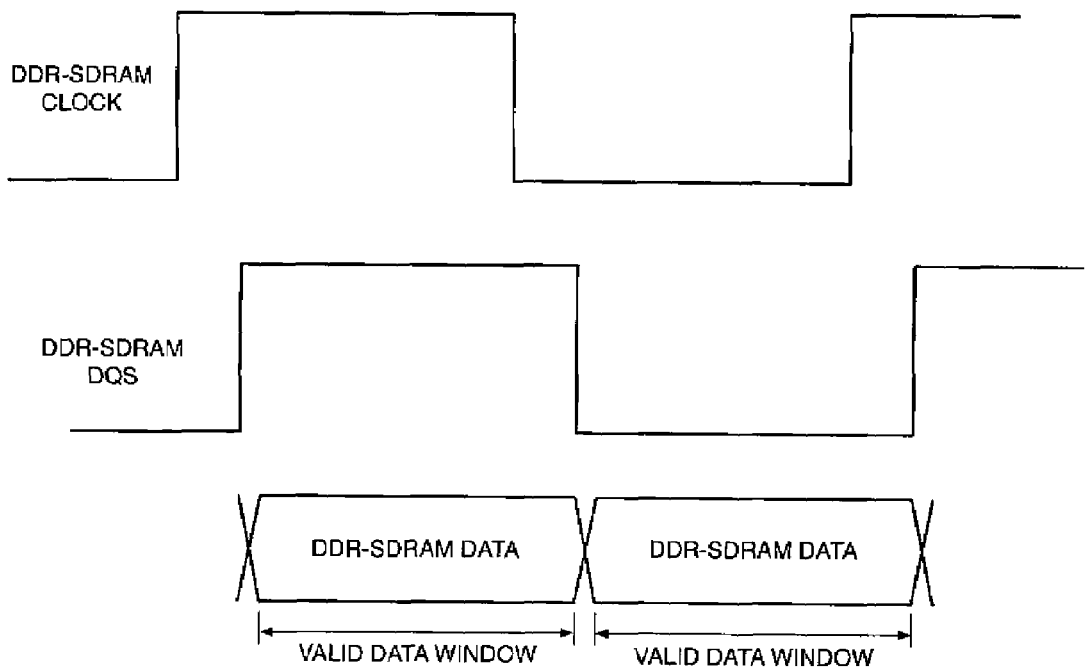
Figure 2:
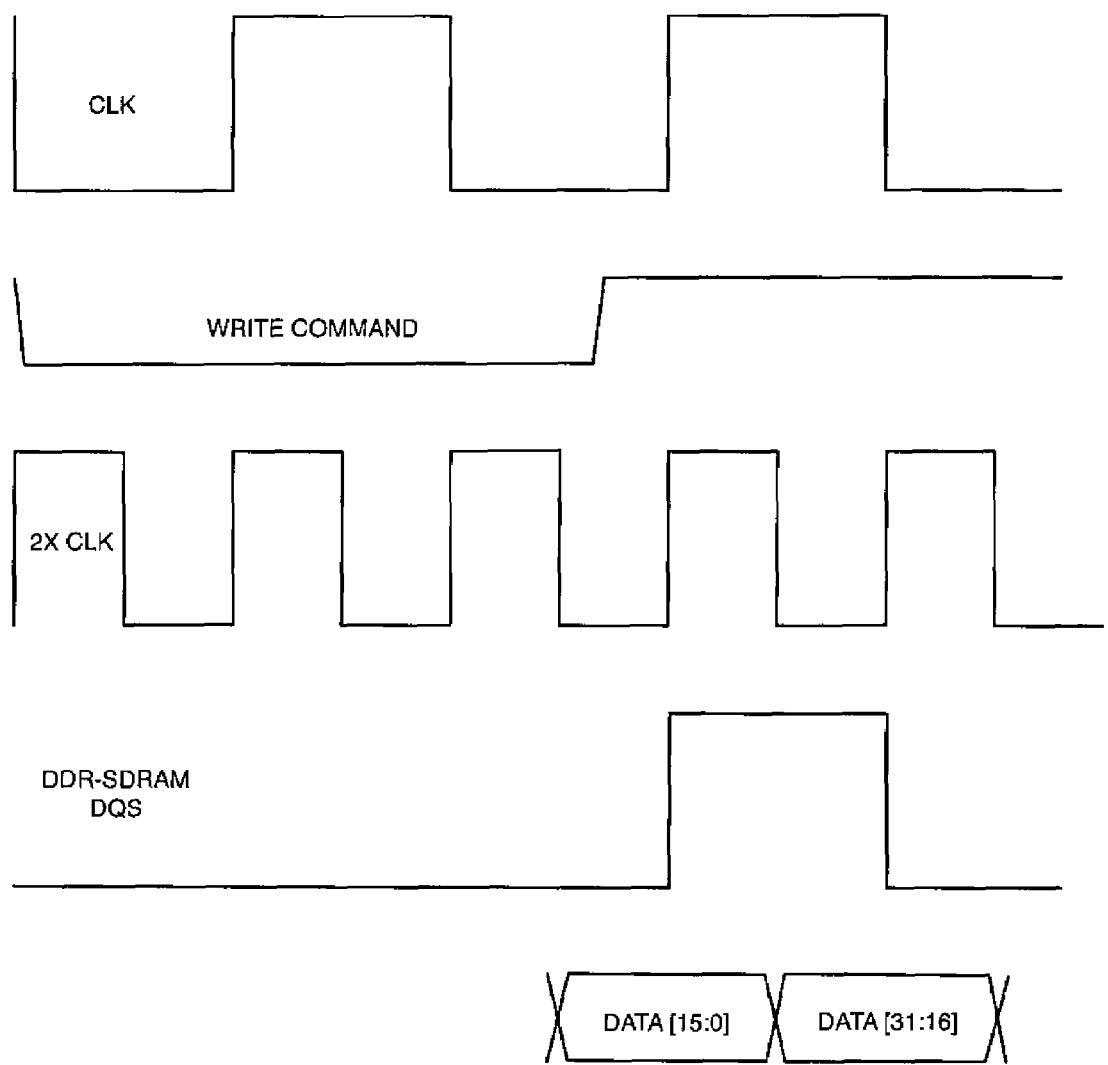
FIG. 2 is a set of waveforms illustrating the relationship between the DQS signal and the data for write operations in DDR-SDRAM devices.

The 2× clock signal on the output of XOR gate 182 on line 184 can be used by the final stage circuitry 186 (a sub-part of the DDR controller) to re-sample data from the system clock domain. Data and other signals may be re-sampled on the falling edge of this 2× frequency clock signal as described with reference to FIG. 2.

Figure 10:
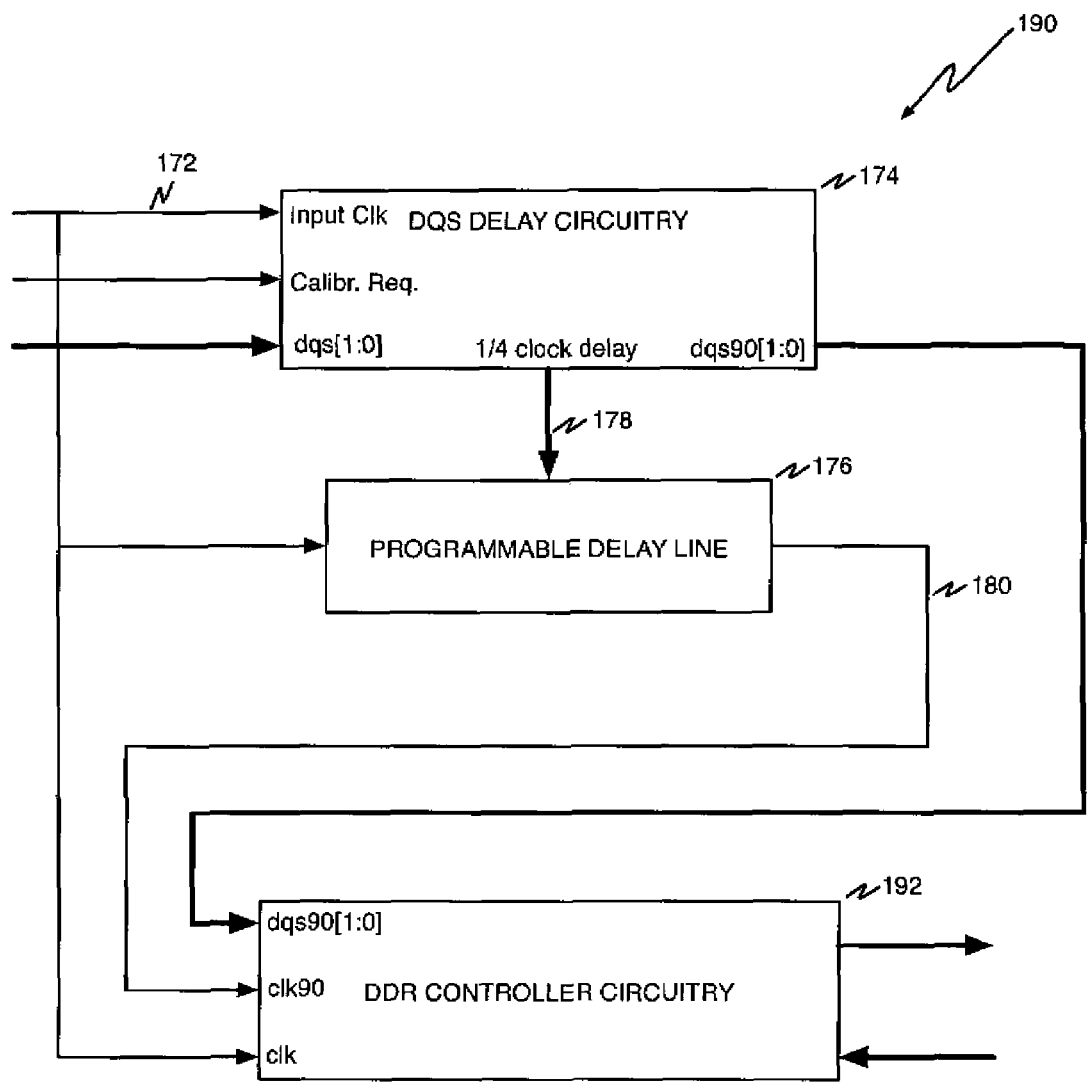
FIG. 10 is a block diagram showing alternate connections between the invention and existing logic.

Referring now to FIG. 10, an alternate circuit 190 may be used to provide data delayed by ¼ DDR clock period. Instead of using the 2× clock frequency signal as shown in the circuit of FIG. 9, the system clock signal on line 172 can be delayed by ¼ of the system clock period in programmable delay line 176. The final stage circuitry 192 of the DDR main circuitry controller will be of course different from the final stage circuitry 186 in FIG. 9 requiring 2× clock. Instead of having DFFs that are sampled on falling edge of a 2× clock, a 2:1 multiplexer will be used for each bit of the data bus to provide to the DDR memory device. All the select pins of the multiplexers will be driven by the clock delayed by a delay equal to ¼ of the period.

This alternate architecture shown in FIG. 10 still uses one additional programmable delay line 176 fed by the system clock 172 signal and the propagation delay value 178 provided by the DQS circuitry 174, but there is no need to employ the 2-input XOR gate 182. The system clock signal 172 is delayed by ¼ of its period and the output 180 of the programmable delay line 176 can be used directly by the DDR memory controller.

Figure 11:
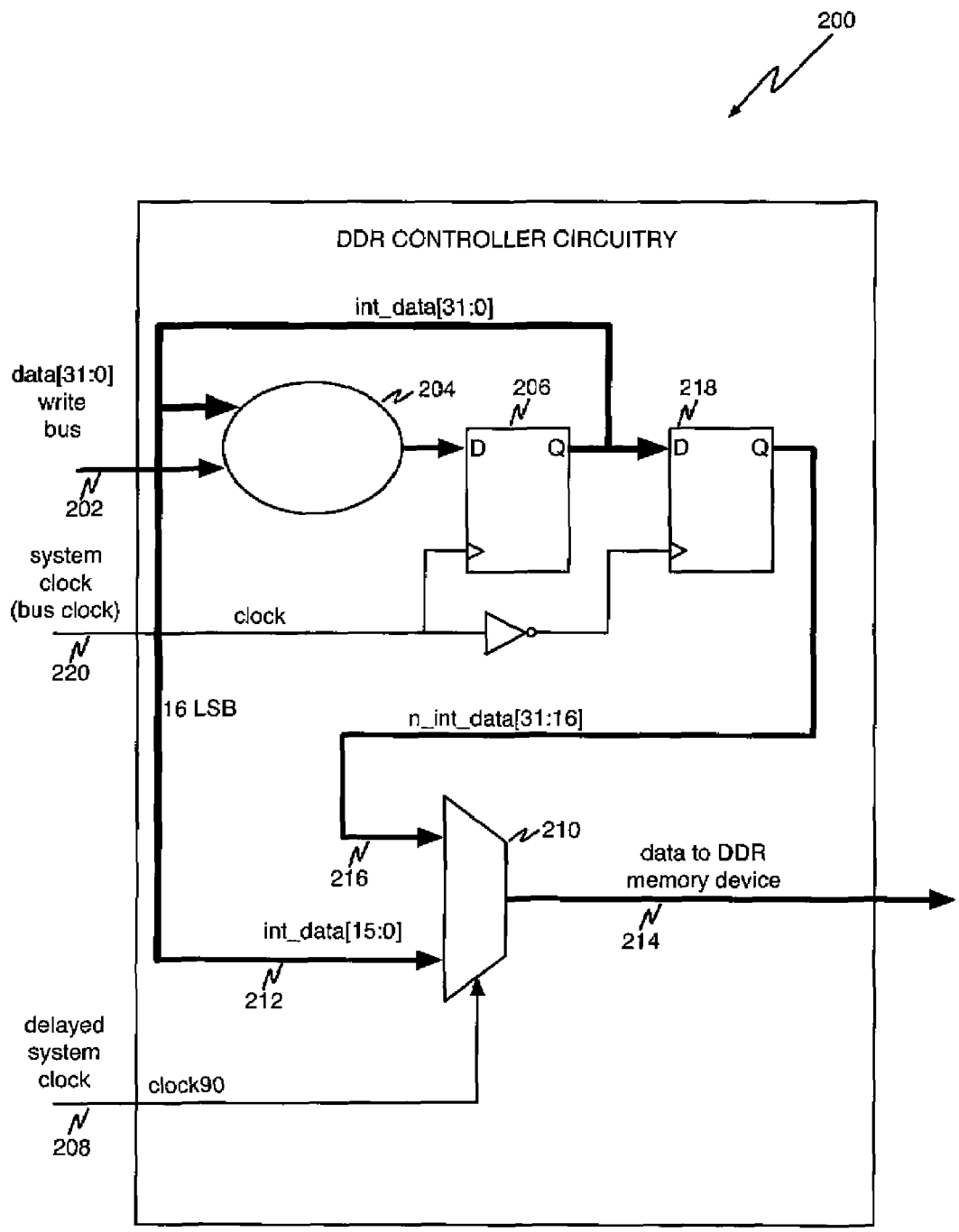
FIG. 11 is a block diagram illustrating an example of output stage circuitry for the DDR memory controller that may be used with the alternate architecture shown in FIG. 10.

An example of output stage circuitry 200 of the DDR memory controller for the alternate architecture circuitry shown in FIG. 10 is described with reference to FIG. 11. The DDR memory controller main circuitry 200 contains processing logic used to manage the address bus (not shown), and the data bus 202. This control logic is represented by combinatorial logic module 204 and DFF 206 for simplicity. The system bus 202 does not hold the data for the main circuitry 200 of the DDR memory controller. Therefore the main circuitry 200 of the DDR memory controller must hold the data. This is the function of combinatorial logic module 204 and DFF 206. Persons of ordinary skill in the art will appreciate that the circuitry shown is illustrative only and not limiting.

Figure 12:
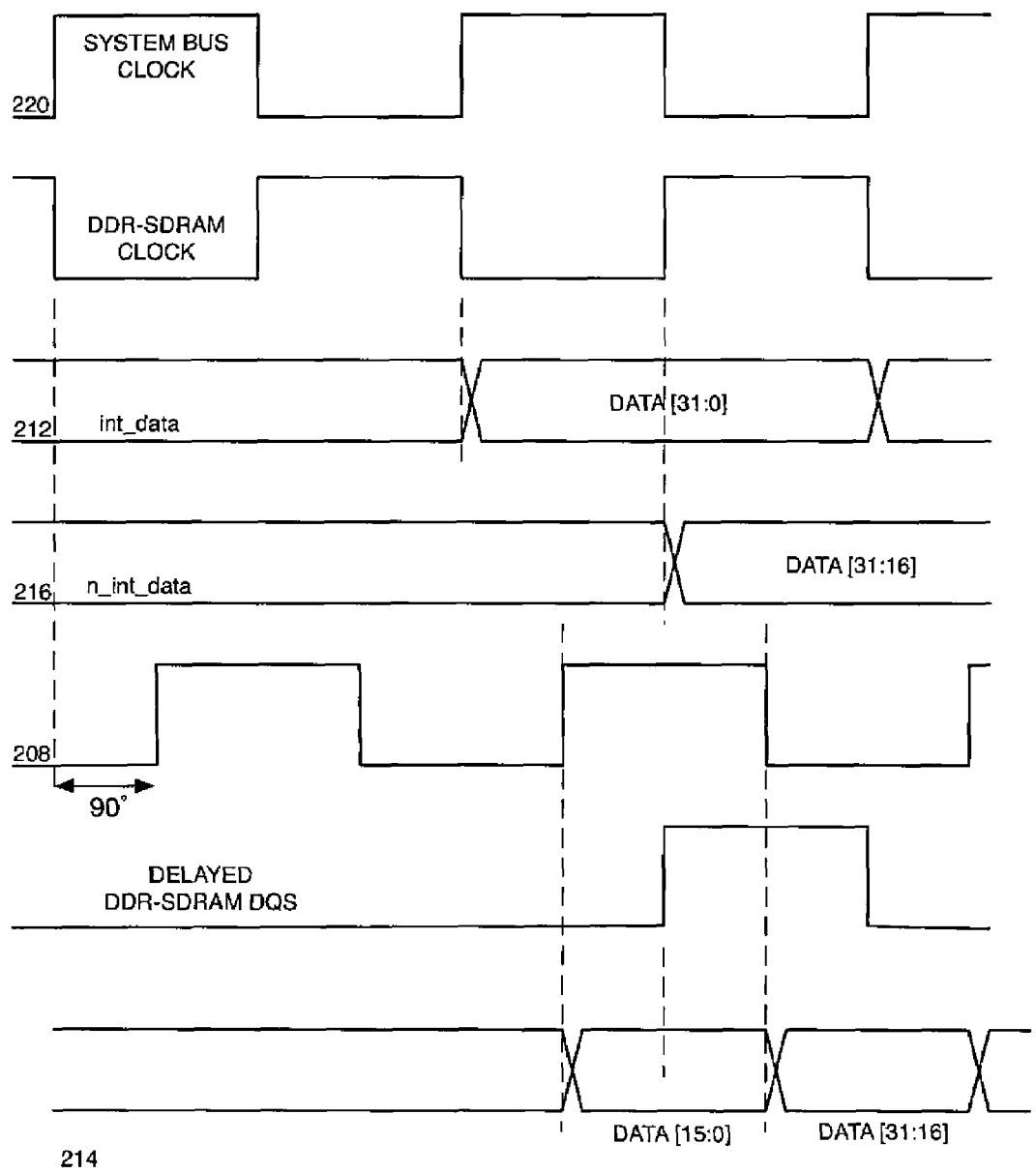
FIG. 12 shows the waveforms produced by the alternate architecture of the output stage of the DDR memory controller of FIG. 11.

The clock signal on line 208 delayed by ¼ of the DDR clock period drives the select input of sixteen (or thirty-two if the DDR data bus is 32-bits wide) 2:1 multiplexers (represented as multiplexer 210). When the clock signal on line 208 is high, the multiplexers 210 select net 212 to pass to the output bus 214. When the clock signal on line 208 is low, the multiplexers 210 select the contents of bus 216 to pass to the output bus 214. Bus 216 contains a copy of the upper half of the bits at the output of DFF 206 latched in DFF 218 on the falling edge of system clock 220 to get correct data during low portion of the delayed system clock 208. Bus 212 contains the lower half of the bits on the output of DFF 206. Therefore the external data bus 214 (data to DDR memory device) 926 toggles between data[31:16] and data[15:0] as described in FIG. 2. FIG. 12 shows the waveforms of the alternate architecture of the output stage of the DDR memory controller in FIG. 11.

The duty cycle of the clock provided to the DDR memory device by the DDR memory controller must be as close as possible to 50%. This is may be difficult to achieve especially if the DDR memory controller main clock belongs to the main clock tree of the micro-controller circuit and/or is driven by a PLL that may not deliver a 50% duty cycle clock waveform. The 50% duty cycle clock is not mandatory for digital logic embedded in microprocessor circuits.

To obtain a 50% duty cycle waveform from a clock that does not have a 50% duty cycle, a divide-by-2 circuit is needed. The associated logic is a simple DFF whose negated output is fed back to its input. The output clock frequency of such a circuit is one half of the frequency of the original clock. Therefore there is a need to multiply by 2 to obtain the original frequency. Such a multiplication can be done using the circuitry of the present invention but the delay applied to the programmable delay line is twice the delay of that in the example given in the disclosure so far herein. Doubling the delay can be simply achieved by translating the value of ¼ clock delay generated by the basic DQS circuitry. This translation logic is a simple combinatorial logic that converts a binary value into another binary value, a sample/hold function to store the 2× clock delay for the system bus clock and an update signal like that used in module 46 of FIG. 5. If the programmable delay line and the XOR gate are designed for the same rising falling propagation delay, then the 2× clock has a 50% duty cycle clock that can be directly used by the DDR memory controller logic to provide the DDR memory with a correct clock. The main circuitry of the DDR memory controller does not need such duty cycle. Therefore, this portion of the logic can be driven by the system bus clock even if it has an unbalanced duty cycle. The advantage of such clock connection is the capability to balance the main clock of the DDR memory controller with the rest of the logic clocked at the same frequency without taking care of the duty cycle and exchanging data with the main logic of the DDR memory controller.

The updating of the programmable delay line generating the 2× clock (clock for DDR memory controller) must be handled with care because this is the clock that is passed to the DDR device. It is important to avoid glitches on this clock when DDR memory accesses are in progress. The updating can be performed when the DDR memory device is in self-refresh mode because there is no clock passed to the device during this mode. This mode of operation does not occur during normal operating mode. Therefore the DDR memory controller must generate the self-refresh command to the DDR memory device prior to enabling an update of the programmable delay line generating the clock. After the update, a normal-operation command can be defined to allow the user to perform accesses. This kind of update limits the bandwidth to the DDR memory device. Therefore the period of update must be long enough to keep from limiting the bandwidth but frequent enough to keep track of derating factors that affect the generation of the clock by using the 2× multiplier based on propagation delay.

Figure 13:
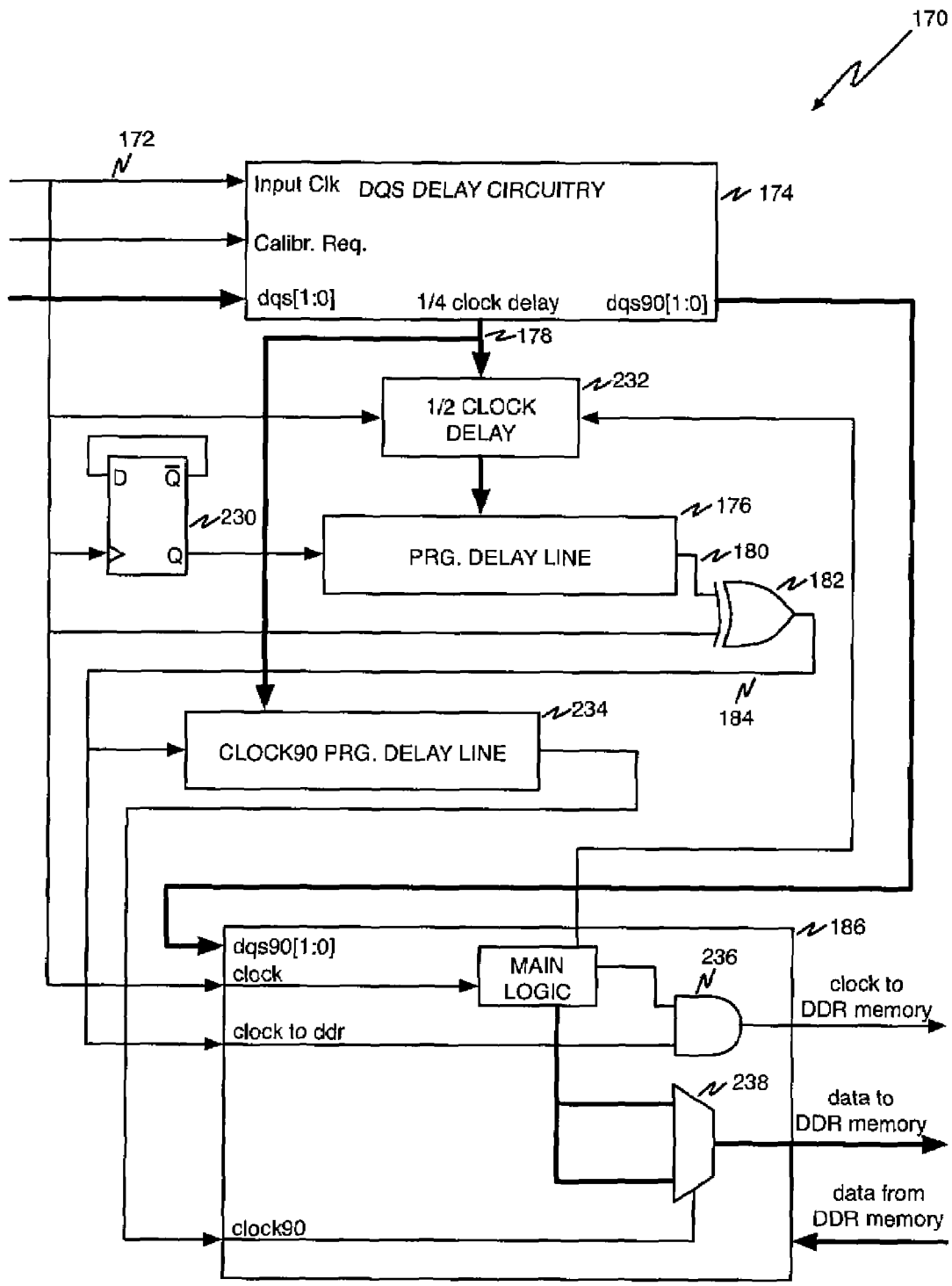
FIG. 13 is a block diagram illustrating an example of output stage circuitry for the DDR memory controller that is independent of duty cycle of the microcontroller system bus clock and may be used to generate a 50% duty cycle DDR clock.
Figure 14:
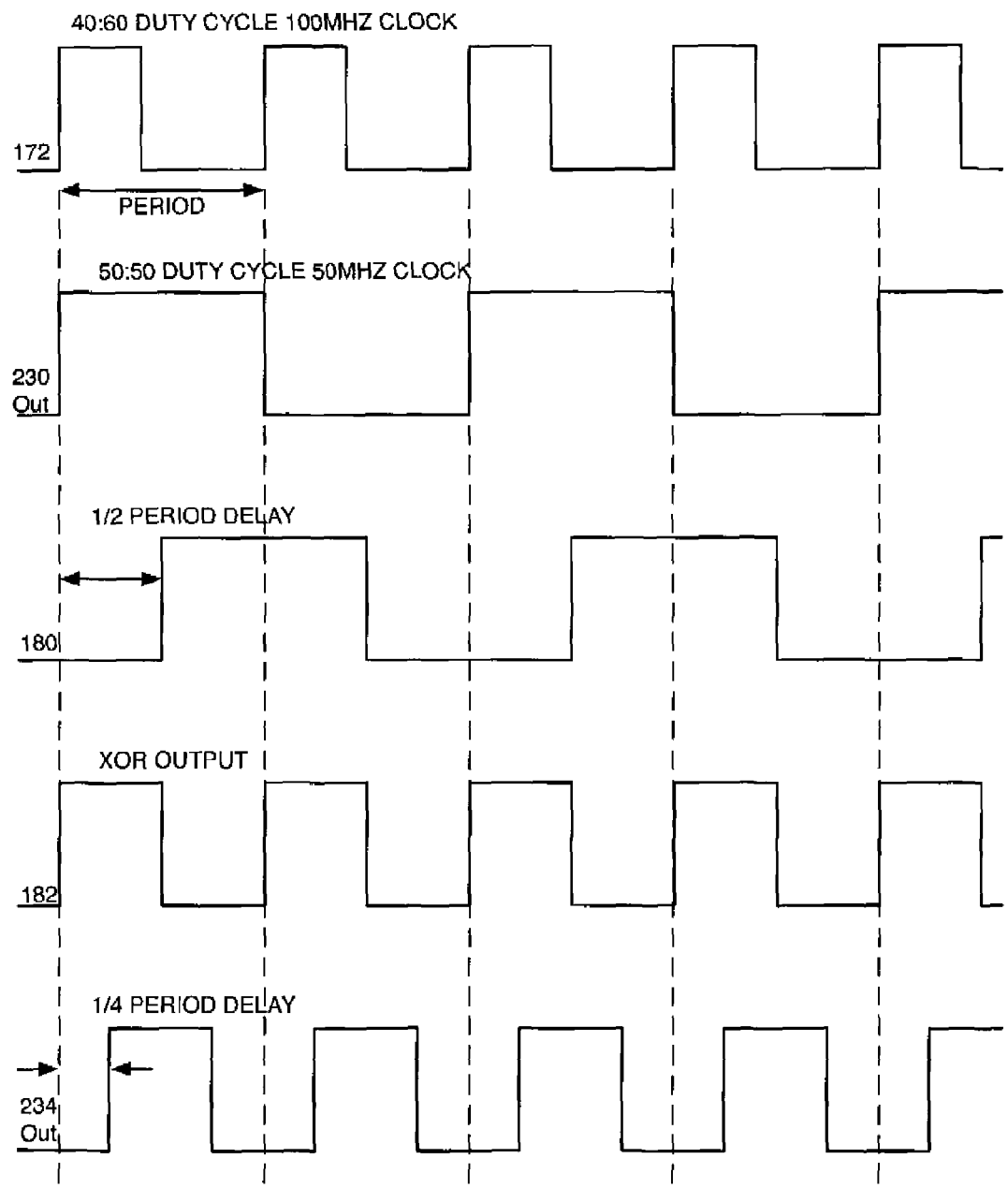
FIG. 14 shows the waveforms produced by the circuit of FIG. 13.

An example of circuitry that can provide the above-mentioned functions is shown in FIG. 13. The circuit of FIG. 13 is essentially the same as the circuit of FIG. 9 (thus like components are designated by like reference numerals), with the addition of DFF 230, ½ clock delay 232, clock 90 programmable delay line 234, AND gate 236, and multiplexer 238. The waveforms associated with the circuit of FIG. 13 are shown in FIG. 14. Delay 232 is designed in the same manner as module 46 of FIG. 5 where a combinatorial network translates the ¼ period delay provided by master circuit 174 to a ½ period delay. Because these delays may not be changed on the fly, there is a sample/hold function implemented using DFF and multiplexer (not shown) but similar to module 46 of FIG. 5. The signal driven by the main logic of module 186 drives the select input of multiplexer 232. In self-refresh operation, the enable is asserted and the delay is updated at the output of multiplexer 232, or else it is recirculated through the DFF and multiplexers to avoid a glitch appearing on the DDR clock. Whatever the duty cycle of clock signal 172, DFF 230 allows a duty cycle of close to 50% on its Q output, assuming that DFF 230 is well balanced in terms of its high-to-low and low-to-high propagation delay. Since the clock frequency is one half of the required DDR clock frequency, programmable delay line 176 and XOR gate 182 together act as a X2 multiplier. Whatever the duty cycle of the main clock tree of the microcontroller, the DDR clock has a duty cycle of essentially 50% and the duty cycle correction is limited in a known and nearby silicon area of the layout of the integrated circuit.

Because a huge clock tree cannot guaranty a 50% duty cycle for deep sub-micron technologies, even if balanced propagation delay cells are used, it is possible to use two divide-by-2 circuits in the present invention. Two examples of such circuits are contemplated according to the present invention and are shown in block diagram form in FIGS. 15 and 16. The circuit of FIG. 15 generally corresponds to the circuit of FIG. 10 and the circuit of FIG. 16 generally corresponds to the circuit of FIG. 9 (wherein like components are designated by like reference numerals).

Figure 15:
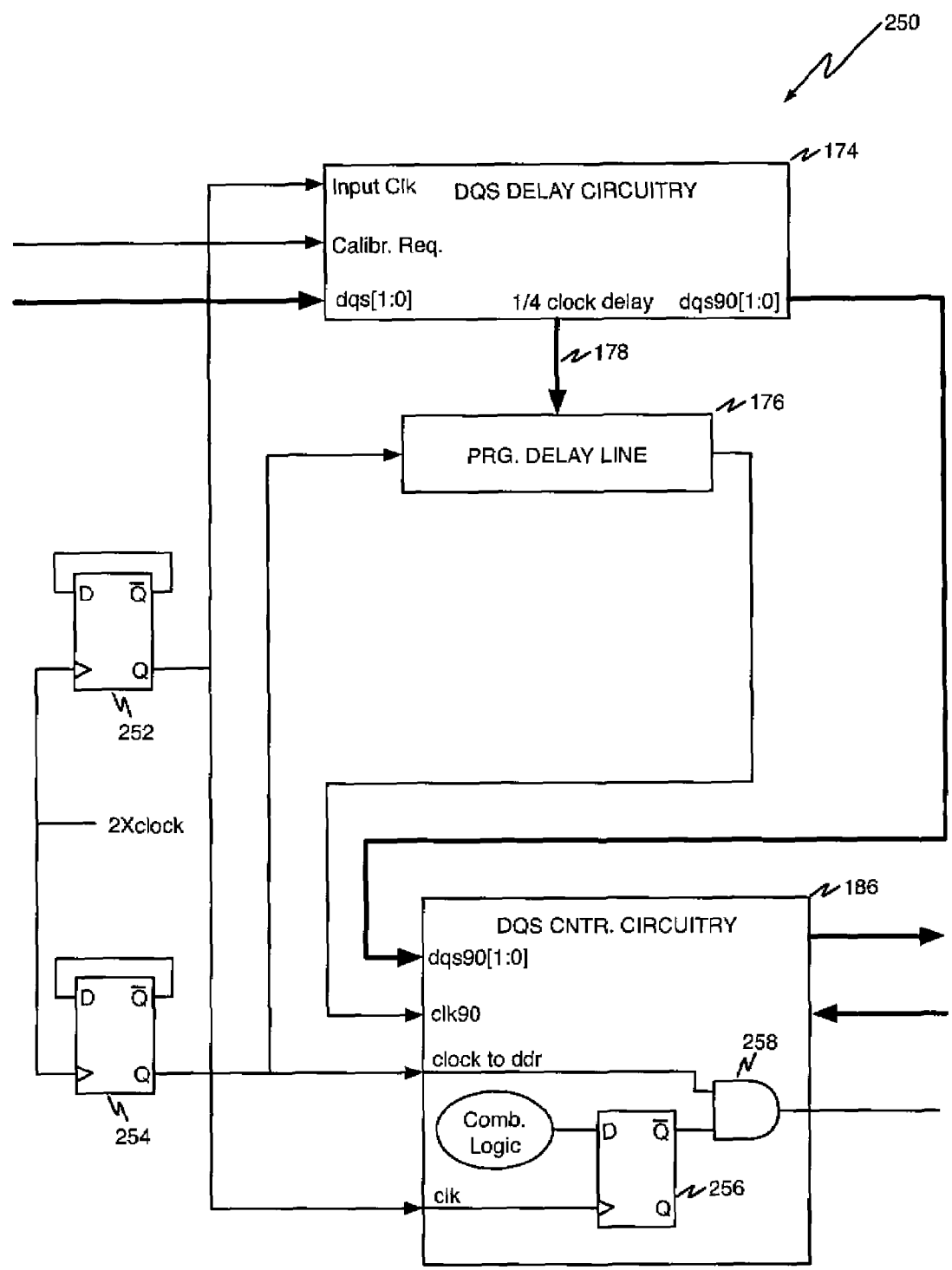
FIG. 15 is a block diagram illustrating a first example of typical usage of the present invention.

Referring now to FIG. 15, a block diagram shows a circuit 250 that illustrates the manner in which a 50% duty cycle clock system according to the present invention connects to existing DDR controller logic. The circuit 250 operates much like the circuit of FIG. 9, except that the 2X clock signal is fed to the clock inputs of both DFFs 252 and 254. The Q! output of DFF 252 is fed back to its data input to form a first divide-by-2 circuit. The Q output of DFF 252 is used to drive the input clock of DQS delay circuitry 174. The Q! output of DFF 254 is fed back to its data input to form a second divide-by-2 circuit. The Q output of DFF 254 is used to drive the input clock of DQS control circuitry 186. Internal logic drives the data input of DFF 256. The Q! output of DFF 256 drives one input of AND gate 258. The clock signal at the output of DFF 252 drives the other input of AND gate 258. The output of AND gate 258 provides the clock signal to send to the DDR-SRAM memory device.

The first divide-by-2 circuit (DFF 252) is placed close to the DDR memory controller logic. This divide-by-2 circuit creates the 1× clock (example: 100 MHz) from the 2× clock (i.e. 200 Mhz). The clock tree is sourced from this signal and drives all of the peripherals on the system bus in the microcontroller. The second divide-by-2 circuit (DFF 254) is positioned close to the DDR memory controller logic and/or pad providing the clock signal. According to the invention, a limited amount of logic will be driven by this clock signal (e.g., just the enable/disable of the clock to provide to the DDR memory device and the programmable delay line 176). Thus, whatever the duty cycle ratio of the 2× clock, the 50% duty cycle of the clock provided to the DDR is easier to achieve because it is not altered by possible clock tree logic which is not necessary because of the limited number of cells on this branch. The only remaining place-and-route constraint to assure that all of the internal/external signals will be correctly aligned is to balance the 2× clock rising edges with the 1× clock rising edges. DFF 252 is a divide-by-2 circuit that can be placed close to the main PLL of the microcontroller (can be far from DDR memory controller location in the layout).

Figure 16:
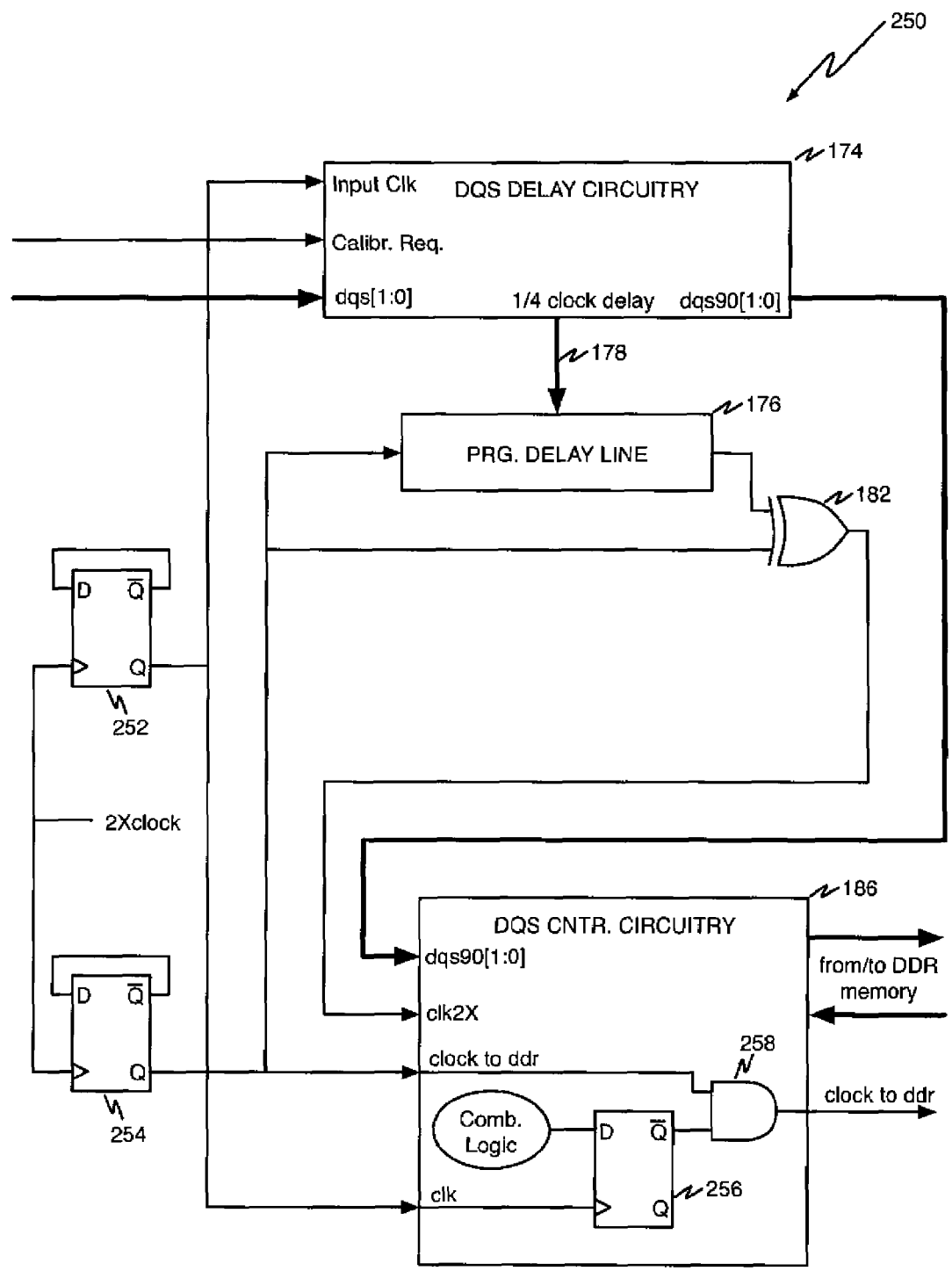
FIG. 16 is a block diagram illustrating a second example of typical usage of the present invention.

Referring now to FIG. 16, an alternate embodiment of the circuit of FIG. 15 is shown. This embodiment is similar to the embodiment of FIG. 10, and operates in much the same way as the circuit of FIG. 10, with the same differences as noted with respect to the circuit of FIG. 15.

This aspect of the present invention reduces the number of DFFs driven by the 2× clock frequency in the DDR memory controller and therefore alleviates the routing issues on the 2× clock net if one is required.

The proposed architecture does not require balancing the leaf pin of the 2× clock replacement signal because there is no DFF driven by this signal and therefore no need for scan testability logic for digital cells. If not balanced, each bit of the data bus may switch at a different time slot (within the specified timing by the DDR memory device) and therefore may limit the peak current otherwise due to the simultaneous switching of outputs. The voltage drop is therefore limited in the circuit.

Both architectures may provide the same number of simultaneously switching outputs. In both architectures this may be improved by adding delays at the outputs of each sequential cell (DFF or latch) generating each bit of the data bus for the prior art architecture. This can be done at two different levels according to the present invention. Either a different delay may be added in each select input branch of the multiplexers generating the data bus or adding delays at the outputs of the multiplexers. It is possible to add a different delay (e.g., 100 ps in one branch, 150 ps in another branch, etc.) having a spread being limited by the timing specifications of the DDR-SDRAM memories and other parameters including system performance. There is no advantage to limiting the peak current compared to prior art architectures.

In the architecture of the present invention, the 2× clock frequency generation is only required for the 50% duty cycle ratio of the clock sent to the memory device. If the clock tree of the main clock (clock 1×) of the DDR memory controller has a 50% duty cycle ratio, then it is possible to eliminate generation of the 2× clock, thereby simplifying routing of clock nets. Moreover, If, in the future, a memory device does not require such duty cycle ratio, then the 2× clock generation will be not be needed for DDR access.

The 2× clock cannot have a 50% duty cycle ratio. Therefore when using the falling edges of this clock to drive the write logic portion of the microcontroller, the data are not well aligned with the clock provided to the DDR memory device. Using the present invention and the re-generated 1× clock or clock delayed by ¼ clock period, the timing of data provided to the DDR memory controller is independent of the unknown duty cycle of the 2× clock (unless it derived from an already divided by 2 signal that will require a 4× clock frequency signal).

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A circuit for providing delayed clock signals to synchronous memory controller controlling a synchronous memory device, comprising:
    logic delay circuitry for performing synchronous memory device read access, the logic delay circuitry generating delay interval information to apply to a control signal sent to the synchronous memory device;
    a programmable delay line receiving the delay interval information from the logic delay circuitry, and a clock signal to delay having the same frequency and waveform as the clock signal provided to the synchronous memory device, the programmable delay line having an output to provide the delayed clock signal;

the circuit generating a signal delayed by approximately ¼ of the clock period of the clock signal sent to the synchronous memory device.

2. The circuit of claim 1 embedded in a micro-controller circuit.

3. The circuit of claim 1 driving a double data rate memory controller.

4. The circuit of claim 2 where the synchronous memory device is a double data rate memory.

5. The circuit of claim 4 where the programmable delay line receives the delay interval information from a delay circuit using a programmable delay line to delay a control signal received from the synchronous memory controller during read access.

6. The circuit of claim 5 where the delay received is a fraction of the clock period signal sent to the synchronous memory device.

7. A circuit for providing clock signals to a synchronous memory controller controlling a synchronous memory device, comprising:

logic delay circuitry for performing synchronous memory device read access, the logic delay circuitry generating delay interval information to apply a delay to a control signal sent to the synchronous memory device;

a divider circuit to divide the frequency of the clock signals by 2;

a first programmable delay line receiving the signal generated by the output of the divider circuit and the delay interval information to apply to the memory device control signal calculated from the delay provided by logic delay circuitry required to perform synchronous memory device read access;

a 2× clock signal circuit generating a delayed 2× clock signal from the clock signal and the output of the programmable delay line, and a second programmable delay line receiving the signal generated by the output of the first programmable delay line and the delay interval information.

8. The circuit of claim 7 embedded in a micro-controller circuit.

9. The circuit of claim 7 driving a double data rate memory controller.

10. A method for providing a delayed clock signal to a synchronous memory controller controlling a synchronous memory device, comprising:

generating delay interval information to delay a control signal for performing synchronous memory device read access;

delaying a clock signal by an amount of time related to the delay interval information to generate the delayed clock signal; and combining the clock signal and the delayed clock signal to provide a delayed 2× clock signal.

11. The method of claim 10 wherein generating delay interval information for the control signal for performing synchronous memory device read access comprises generating delay interval information for a DQS signal for a DDR-SDRAM.

12. The method of claim 10 wherein delaying the clock signal by an amount of time related to the delay interval information to generate the delayed clock signal comprises delaying the clock signal in a programmable delay line controlled by the delay interval information.

13. A method for providing a delayed clock signal to a synchronous memory controller controlling a synchronous memory device, comprising:

generating delay interval information to apply a delay to a control signal for performing synchronous memory device read access;

dividing the frequency of the clock signal by 2 to provide a divided clock signal;

delaying the divided clock signal by an amount related to the delay interval information;

performing an exclusive-OR function on the divided clock signal provide a delayed clock signal; and delaying the control signal by an amount related to the delay interval information.

14. The method of claim 13 wherein generating delay interval information for the control signal for performing synchronous memory device read access comprises generating delay interval information for a DQS signal for a DDR-SDRAM.

15. The method of claim 13 wherein:

delaying the divided clock signal by an amount of time related to the delay interval information to generate the delayed clock signal comprises delaying the clock signal in a programmable delay line controlled by the delay interval information; and delaying the control signal by an amount related to the delay interval information comprises delaying the control signal in a programmable delay line controlled by the delay interval information.

16. A method for providing delayed clock signals to synchronous memory controller controlling a synchronous memory device, comprising:

generating delay interval information to apply a delay to a control signal for performing synchronous memory device read access;

delaying a clock signal having the same frequency and waveform as the clock signal provided to the synchronous memory device by an amount of time related to the delay interval information to generate the delayed clock signal;

wherein the delayed clock signal is delayed by approximately ¼ of the clock period of the clock signal sent to the synchronous memory device.

17. The method of claim 16 wherein generating delay interval information for the control signal for performing synchronous memory device read access comprises generating delay interval information for a DQS signal for a DDR-SDRAM.

18. The method of claim 16 wherein delaying the clock signal by an amount of time related to the delay interval information to generate the delayed clock signal comprises delaying the clock signal in a programmable delay line controlled by the delay interval information.

19. The circuit of claim 1 further including a 2-input XOR gate receiving both the clock signal and the output of the programmable delay line, an output of the XOR gate providing a delayed 2× clock signal.

20. The circuit of claim 1 wherein the 2× clock signal circuit is a 2-input XOR gate receiving both the clock signal and the output of the programmable delay line, an output of the XOR gate providing a delayed 2× clock signal.

21. The circuit of claim 7 wherein the 2× clock signal circuit is a 2-input XOR gate receiving both the clock signal and the output of the programmable delay line, an output of the XOR gate providing a delayed 2× clock signal.

22. The circuit of claim 10 wherein combining the clock signal and the delayed clock signal to provide a delayed 2× clock signal comprises performing an exclusive-OR function on the clock signal.

\* \* \* \* \*